United States Patent [19]

Winder et al.

[11] 4,145,450
[45] Mar. 20, 1979

[54] METHOD AND APPARATUS FOR CONTROLLING COMPOSITION OF MILK

[75] Inventors: William C. Winder; Richard J. Wagner, both of Madison, Wis.

[73] Assignee: Hartel Corporation, Fort Atkinson, Wis.

[21] Appl. No.: 698,782

[22] Filed: Jun. 22, 1976

[51] Int. Cl.² .............................................. A23C 9/00
[52] U.S. Cl. .................................. 426/231; 73/61 R; 73/73; 426/238; 426/491
[58] Field of Search ............... 426/231, 238, 580, 586, 426/491; 73/61 R, 73, 32, 53, 69

[56] References Cited

U.S. PATENT DOCUMENTS

| | | | |
|---|---|---|---|
| 2,264,665 | 12/1941 | Hall | 233/18 |
| 3,040,562 | 6/1962 | Fitzgerald | 73/53 |

*Primary Examiner*—Hiram H. Bernstein
*Attorney, Agent, or Firm*—Cushman, Darby & Cushman

[57] ABSTRACT

A method and apparatus for continuously monitoring and controlling the composition of a stream of milk is disclosed. A portion of the continuous stream of milk is heated and coupled to a vacuum degasser where the gas in the milk is removed. A portion of the milk is then heated to 45° C. and conveyed to a sound velocity test cell. A second portion of the milk is heated to 65° C. and conveyed to a second sound velocity test cell. The rate at which a sound pulse traverses the milk in each of the cells is determined by determining the frequency with which the pulses traverse the milk in each of the test cells. The resulting frequency is proportional to the velocity of sound through the milk. The frequency values are coupled to a computer wherein two simultaneous linear equations are solved to arrive at the percent fat and the percent solids-not-fat in the milk. In the preferred embodiment, the butterfat level in the milk is controlled by controlling the quantity of cream added to skim milk in accordance with the output of the computer. The solids-not-fat level in the milk is also controlled by controlling the quantity of skim milk concentrate added to skim milk in accordance with the output of the computer.

7 Claims, 1 Drawing Figure

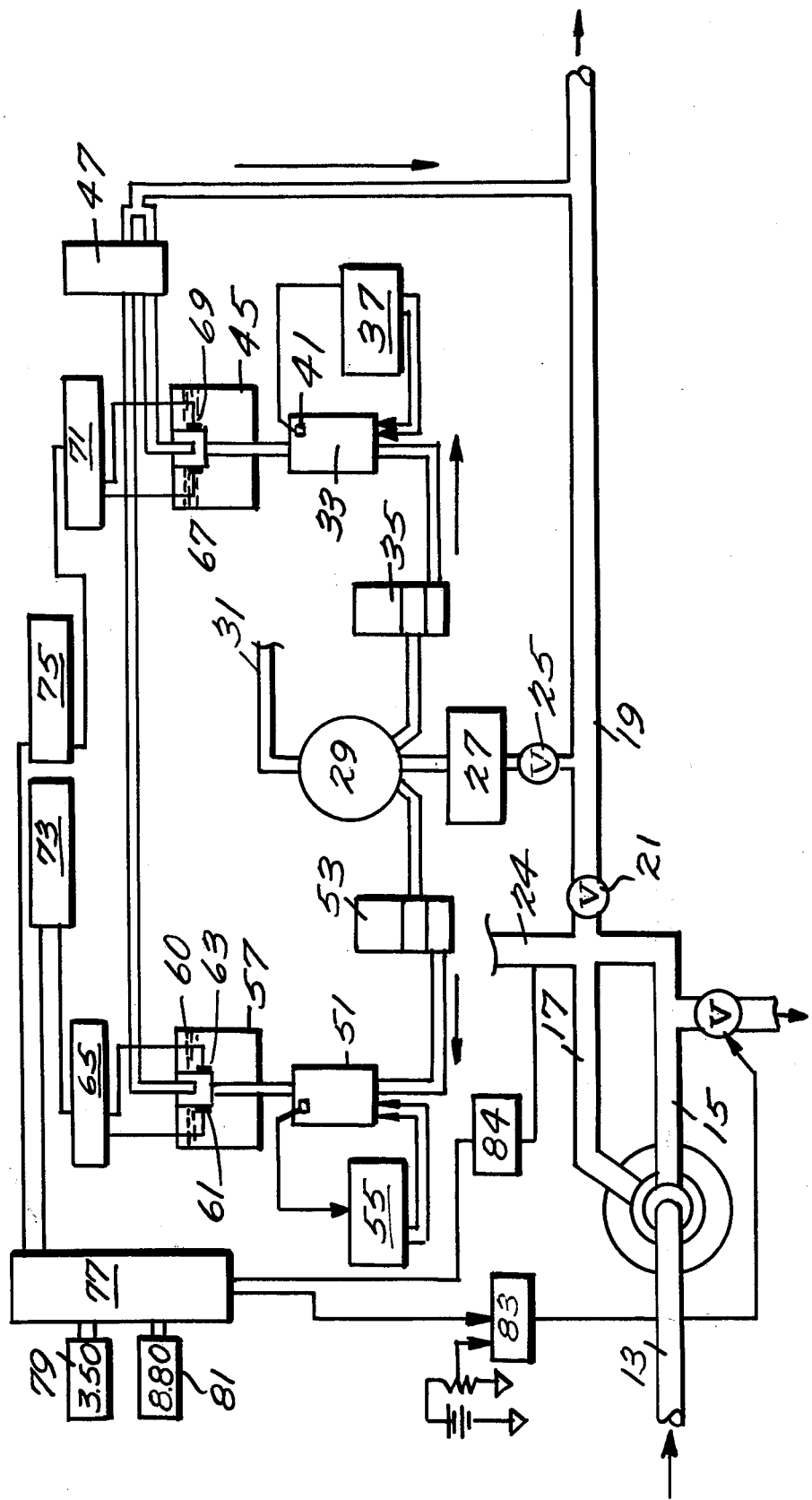

METHOD AND APPARATUS FOR CONTROLLING COMPOSITION OF MILK

BACKGROUND OF THE INVENTION

This invention relates to a method and apparatus for continuously monitoring and controlling the composition of a stream of milk.

The determination of the solid constituents of milk and milk products is of considerable importance in the dairy industry as evidenced by the fact that the amount of such constituents, particularly the butterfat content thereof, is the usual basis for determining their price, food value and compliance with state and federal laws and regulations. In the past the level of butterfat in milk was determined on a batch basis. Thus, analytical tests were intermittently conducted with respect to a stream of milk to determine by chemical means the percentage of butterfat in the milk. Such tests, however, have not been amenable to instantaneous and continuous readings. Further, in most of the batch tests the specimens of milk and milk products tested are rendered inedible and otherwise useless. Further, as it can be readily appreciated, batch testing of milk not only lends itself to the possibility of the occurrence of human errors through the necessity of repeated sampling and testing, but is also extremely inefficient and time-consuming. Perhaps just as importantly, this approach requires a large number of reservoirs, pumps, valves and other types of equipment to provide for the proper storage, transfer and batch mixing operations involved in achieving the appropriate butterfat level for the milk.

In an attempt to overcome the limitations of the batch mixing processes, attempts have been made to provide a continuous milk separating and standardizing process. One such approach is simply to determine visually the fat content of the cream exhausted from a centrifugal milk separator and then after making this determination, to estimate the proportion of cream which must be recombined with the skim milk exhausted from the separator to obtain a milk product of desired fat content. This approach is, of course, entirely dependent upon the skill of the operator and is greatly subject to misjudgment. Other more sophisticated approaches have been developed which utilize various types of flow meters to monitor the flow of milk and cream. As an example, a flow meter is positioned in the raw milk conduit at the input to the separator for providing a visual reading of the flow therethrough. A second flow meter is positioned within the output cream conduit to provide a visual reading of the flow rate of cream exhausted from the separator. By comparing these two readings, a determination is then made through the use of appropriate charts, graphs and the like as to the setting of a manual valve for controlling the flow rate of cream to obtain a desired fat content. A similar determination is required in order to assess the fraction of cream which must be recombined with the skim component of the milk to obtain the desired butterfat content in the milk.

A second continuous milk separating and standardizing process was disclosed by Seiberling in U.S. Pat. Nos. 3,892,584 and 3,946,113. In the Seiberling separating method, the flow rate of milk into a centrifugal separator is measured electronically and the flow rate of the cream component exhausted from the separator is also measured electronically. These signals are correlated in a programmed digital computer. A control signal is then generated by the computer for controlling the flow rate of cream exhausted from the separator. A third flow meter is positioned in a cream exhaust conduit and provides a signal to the digital computer for controlling the amount of cream to be combined with the skim milk from the separator to thereby establish a desired butterfat content therein. This separating technique relies on flow meters and does not give a continuous indication of the level of butterfat in the milk.

It accordingly is an object of this invention to provide an improved method and apparatus for continuously monitoring and controlling the butterfat level in a stream of milk.

It is another object of the present invention to monitor and control on a continuous basis the density of a fluid medium.

SHORT STATEMENT OF THE INVENTION

Accordingly, applicants' invention relates to a method and apparatus for controlling the butterfat content of a stream of milk on a continuous basis. The method includes the steps of heating a first portion of the stream of milk to a first temperature, which is preferably 45° C. A second portion of the stream of milk is heated to a second temperature which is preferably 65° C. The rate at which a sound wave passes through both the first and second portions of milk after heating is determined by determining the frequency with which a sound pulse passes through the first and second heated portions of milk. The resulting frequency levels are coupled in the form of electronic signals to a digital computer wherein two simultaneous linear equations are solved to determine the butterfat and the solids-not-fat content of the milk. The computed percentage of butterfat and percentage of solids-not-fat are dsplayed visually. A control circuit is provided which generates a signal for operating a cream tap valve. Thus, when the percent of butterfat increases above a predetermined desired level, the opening of a cream tap valve is increased to drain off more cream before the cream is combined with skim milk to form the stream of standardized milk. On the other hand, should the butterfat content fall below a predetermined limit, the opening of the cream tap valve is decreased to thereby force more cream into the skim milk to thereby increase the butterfat content of the milk. In a similar manner, the level of solids-not-fat can be controlled by controlling the quantity of skim milk concentrate added to the stream of standardized milk.

BRIEF DESCRIPTION OF THE DRAWINGS

Other objects, features and advantages of the present invention will become more fully apparent from the following detailed description of the preferred embodiment, the appended claims and the accompanying drawing which is a schematic illustration of the preferred embodiment of the apparatus of the present invention.

DETAILED DESCRIPTION OF THE PREFERRED EMBODIMENT

The unique physical properties of milk and milk products make possible the application of acoustic methods for determining the proportions of the constituents of the milk. Thus, milk is heterogeneous substance consisting of a fat phase dispersed in an aqueous phase. The aqueous phase is made up of solids in colloidal suspension, i.e., proteins, and solids in true solution, i.e., lactose and mineral salts. These solids taken together comprise the solids-not-fat group. The method of the present invention is based on the fact that the major chemical constituents of milk are substantially the same and appear in essentially the same physical state. Further, as disclosed in Fitzgerald et al, U.S. Pat. No. 3,040,562, the amount of solids-not-fat present in the milk or milk products under test affects the velocity of propagation of a sound wave therethrough. Accordingly, the use of acoustics can provide a unique determination of the amount of solids-not-fat in milk.

The fat phase of milk is present in whole milk as an emulsion of butterfat globules in the aqueous phase. The fat globules are several thousand times larger than the colloidal particles of the aqueous phase. As a consequence of the size difference as well as the difference in acoustic properties between the fat globules and solids-not-fat, whole milk acts like a composite acoustic medium of butterfat particles dispersed in a continuous medium of skimmed milk. As is known in the art, as examplified by the teachings of Fitzgerald et al, U.S. Pat. Nos. 3,040,562, the velocity of propagation of a sound wave in whole milk varies with the amount of fat present in the milk and with the temperature thereof.

In accordance with the present invention and as will be more fully explained hereinbelow, the velocity of sound waves through the milk at two different temperatures is determined with the resulting velocity determinations providing sufficient information to solve two simultaneous linear equations for the percent of butterfat and the percent of solids-not-fat in the milk.

Refer now to the figure where there is disclosed a schematic illustration of the preferred embodiment of applicants' invention. Raw milk from storage, typically at a temperature of 4° C., is conveyed to a centrifugal separator 11 via raw milk conduit 13. As is known in the art, the centrifugal separator separates the cream from the milk and exhausts the cream through cream exhaust conduit 15. The remaining skimmed milk is exhausted from the separator skim milk conduit line 17. The cream and the skimmed milk are recombined in the standardized milk conduit 19 by means of a mixing pump 21 of conventional design. A portion of the cream is conveyed away from the system via cream tap valve 23 to be used for other purposes. The mixed cream and skimmed milk is conveyed by means of the standardized milk conduit 19 for further processing.

A portion of the milk in the standardized milk conduit is continuously withdrawn through control valve 25 and heated in a heat exchanger 27 to about 30° C. The milk is then degassed, i.e., the air removed therefrom, in a conventional vacuum degasser 29. The resulting air driven from the milk is passed outwardly through exhaust line 31. A portion of the degassed milk is then conveyed to a heater 33 via a double headed intake pump 35. The heater is preferably of the electrical type and is energized from a power source 37 via lines 39. A thermocouple 41 or other suitable temperature detecting device monitors the temperature of the milk and couples this signal back to a control circuit within the power source 37 to control the level of energization of the heater 33 so that the desired temperature level is continuously maintained. Such an arrangement is of conventional design and accordingly is not described in detail herein. In the preferred embodiment, the milk in heater 33 is heated to 45° C. The heated milk is then passed into a sound velocity test cell 45. The test cell 45 includes water bath 46 and a sound velocity detecting apparatus to be more fully explained hereinbelow. The overflow of the milk from the test cell is pumped by means of a doubleheaded discharge pump 47 back to the standardized milk conduit 19 where the test milk is recombined with the milk therein.

A second portion of the degass milk is conveyed to a second heater 51 by means of a doubleheaded intake pump 53. Heater 51 is substantially identical to heater 33 and is controlled by a power source 55. In the preferred embodiment, heater 51 heats the milk to 65° C. After the milk has been heated to 65° C. in heater 51, it is conveyed to a second sound velocity test cell 57 which cell includes water bath 58 and a second sound velocity meter of the same type used in the test cell 45. The overflow of the test milk from test cell 57 is conveyed back to the standardized milk conduit by means of the doubleheaded discharge pump 47. It is noted that one advantage to applicants' invention is that the milk withdrawn from the standardized milk conduit for testing can be recombined with the milk in the standardized milk conduit after going through the tests performed thereon to determine the butterfat and solids-not-fat level thereof. Another advantage of applicants' invention is the fact that a stream of milk is continuously withdrawn from the standard milk flow, tested and then recombined therewith. Thus, the standardized milk is continuously tested after it is combined in mixer pump 21 to provide an instantaneous monitor and control of the butterfat level of the milk.

The sound velocity detectors are of conventional design known in the art and are of the sing-around velocimeter type disclosed by Lemon et al in U.S. Pat. No. 3,392,574. The sound velocity detector 60 includes a pair of matched piezoelectric crystals 61 and 63 mounted at a preset distance from one another. Leads are brought through a cover (not shown) and are connected to each of the crystals. The resulting structure can be mounted on the test cell 57 by means of a flange or simply by immersing the spaced piezoelectric cells within the bath of milk. The other ends of the leads which are connected to the piezoelectric cells are connected to the output of an oscillator 65. The oscillator provides an output signal, preferably in the form of a pulse, which is coupled to one of the crystals, e.g., crystal 61. As a consequence of the piezoelectric properties of the crystal, pulse waves are set up in the milk which propagate through the milk to the other piezoelectric crystal 63. Crystal 63 thus generates an electrical signal which is coupled back to the oscillator to initiate a second pulse. It can be seen that as the velocity of sound in the milk increases, the frequency with which the pulses are coupled to crystal 61 is increased. Thus, the resulting frequency of the oscillator 65 is proportional to the velocity of sound of the milk in the test cell 57. The same mode of operation occurs in the test cell 45 wherein two piezoelectric crystals 67 and 69 are positioned opposite one another with an oscillator 71 generating pulses which are converted by crystal 67 into sound waves and then reconverted back into electrical signals by means of crystal 69.

Applicants have discovered that the frequency, i.e., the velocity of sound in the milk, is directly correlated with the percent of butterfat in the milk and the percent of solids-not-fat therein with the relationship between butterfat and solids-not-fat to the velocity of sound therethrough being dependent upon the particular temperature of the milk. Thus, the following simultaneous linear equations correlate the percent of butterfat and the percent of solids-not-fats in milk to the velocity of sound therethrough at two different temperatures:

$$V_{45} = K_1(\% \, BF) + K_2(\% \, SNF) + K_3 \tag{1}$$

$$V_{65} = K_4(\% \, BF) + K_5(\% \, SNF) + K_6 \tag{2}$$

wherein $V_{45}$ is the velocity of sound through the milk in test cell 45 when the milk is at 45° C., $V_{65}$ is the velocity of sound through the milk in test cell 57 when the milk is heated to 65° C., and $K_1, - K_6$ are parameters which are determined empirically before the system goes on line and which hold substantially constant for butterfat levels ranging between 0 and 20%. From these equations it can be seen that the velocity of sound through milk at 65° C. and at 45° C. is directly proportional to the percent of butterfat and the percent of solids-not-fat within the milk. It further can be seen that since the velocity of sound in milk is directly proportional to the frequency of the generation of pulses by the oscillators 65 and 71, the values of pulse frequency can be substituted in equations (1) and (2), provided the constants $K_1$-$K_6$ are appropriately translated. Thus, the following equations represent the percent butterfat and solids-not-fat in relations to the pulse frequency in each test cell:

$$F_{45} = K_a(\% \, BF) + K_b(\% \, SNF) + K_c \tag{3}$$

$$F_{65} = K_{a'}(\% \, BF) + K_{b'}(\% \, SNF) + K_{c'} \tag{4}$$

If equations (3) and (4) were simultaneously solved to derive the percent of butterfat, only two unknowns would be required, namely, the frequency of pulse generation as determined by oscillators 65 and 71. In addition, the percent of solids-not-fat could be determined by solving the equations with an appropriate substitution of the frequency levels from the oscillators 65 and 71. The frequency of pulses generated by the oscillators 65 and 71 are detected by frequency counters 73 and 75, respectively. The resulting frequency levels detected by the frequency counters 73 and 75 are conveyed in the form of digital signals to a conventional digital computing circuit 77. It should be understood that an analog system could be utilized if the outputs of the frequency counters 73 and 75 were converted to appropriate analog signals which correspond to the digital frequency level signals. The computer 77 is programmed to solve equations (3) and (4) simultaneously in a manner well known in the art and, accordingly, the details of the computer and the program listing for the process of solving the equations are not disclosed herewith. The computer simultaneously solves equations (3) and (4) to determine the percent butterfat within the milk and the percent of solids-not-fat. The resulting computations are coupled to readout devices 79 and 81 where the appropriate butterfat and solids-not-fat content levels are displayed, respectively.

A control circuit 83 is disclosed which includes a differential amplifier and an analog-to-digital converter. When the percent of butterfat exceeds a predetermined desired level, an output signal is provided for increasing the opening of the cream tap valve 23 to permit a greater drain-off of cream from the system. This would act to reduce the amount of butterfat within the milk in the standardized milk conduit 19 and would hence reduce the detected level of the butterfat. On the other hand, if the butterfat level in the milk falls below a predetermined desired level, an output signal is generated by the control circuit 83 for decreasing the opening of the cream tap valve to thereby force more of the cream in cream line 15 into the standardized milk conduit 19. This will increase the butterfat content in the milk and hence will increase the detected butterfat level therein. It should be understood that both the control circuit 83 and the cream tap valve 23 are of conventional design known in the art and accordingly are not disclosed herein in detail.

A second control circuit 84 includes a differential amplifier and an analogue-to-digital converter. When the percentage of solids-not-fat exceeds a predetermined desired level, an output signal is provided for increasing the opening of a valve 24. Valve 24 controls the flow of a skim milk concentrate from a source not shown. When the opening of valve 24 is increased, additional solids-not-fat in the form of concentrated skim milk is mixed with the skim milk in conduit 17 and the cream in conduit 15 to thereby increase the percentage of solids-not-fat in the milk. If, on the other hand, the butterfat level in the milk falls below a predetermined desired level, an output signal is generated by the control circuit 84 for decreasing the opening of the valve 24 to thereby reduce the solids-not-fat in the standardized milk conduit 19. It should be understood that both the control circuit 84 and the valve 24 are of conventional design known in the art and accodingly are not disclosed herein in detail.

While in the preferred embodiment two simultaneous linear equations are solved to derive the percentage of butterfat and solids-not-fat, it should be understood that second order simultaneous equations can be solved, if desired, to derive the percentage of butterfat and solids-not-fat. Such second order equations provide greater accuracy, particularly over a control range of 0–20% butterfat. The equations are set out as follows:

$$F_{45} = K_a(\%BF) + K_b(\%BF)^2 + K_c(\%SNF) + K_d \tag{5}$$

$$F_{65} = K_{a'}(\%BF) + K_{b'}(\%BF)^2 + K_{c'}(\%SNF) + K_{d'} \tag{6}$$

Wherein the constants $K_a$-$K_d$ and $K_{a'}$-$K_{d'}$ are derived by empirical correlation with actual analysis performed by chemical methods.

It can be seen from the aforementioned that the butterfat and solids-not-fat levels of milk can be continuously tested while on stream without damage to the milk being tested and without requiring extra storage vessels or interference with the normal processing of the milk. Further, it can be seen from the aforementioned that applicants have provided a control system wherein the level of butterfat and solids-not-fat in milk can be easily controlled on a continuous basis to provide a very accurate and efficient means for controlling the level of butterfat and solids-not-fat in the milk.

While applicants have disclosed a preferred embodiment of their invention, it should be understood that there may be other alternate embodiments which fall within the spirit and scope of the invention as defined by the appended claims.

What is claimed is:

1. A method of continuously controlling the butterfat content of a stream of milk comprising the steps of:
   heating a first portion of said stream of milk to a first temperature,
   heating a second portion of said stream of milk to a second temperature, said second temperature being different from said first temperature, determining the rate at which a sound wave passes through said first portion of milk after said first portion is heated to said first temperature, determining the rate at which a sound wave passes through said second portion of milk after said second portion of milk is heated to said second temperature, deriving the level of butterfat in said milk from said determined rates at which said sound waves pass through said portions of milk, and controlling in response to said desired butterfat level the quantity of cream mixed with said milk to give a predetermined level of butterfat therein.

2. A method of continuously controlling the butterfat content of a stream of milk comprising the steps of heating a first portion of said stream of milk to a first temperature, heating a second portion of said stream of milk to a second temperature, said second temperature being different from said first temperature, determining the rate at which a sound wave passes through said first portion of milk after said first portion is heated to said first temperature, determining the rate at which a sound wave passes through said second portion of milk after said second portion is heated to said second temperature, determining the difference of the rate at which said sound passes through each of said portions of milk, generating a signal corresponding to said difference having a magnitude corresponding to the level of butterfat in said milk, comparing said generated signal with a predetermined signal level corresponding to the desired level of butterfat in said milk, generating an error signal having a polarity which depends on whether the butter fat level in said milk is above or below said predetermined desired level, and controlling the supply of cream to said milk in response to said error signal to control the butterfat content of said milk.

3. The method of claim 2 wherein said steps for determining the rate at which a sound wave passes through said first and second portions of milk comprises the steps of:

generating a sound pulse at a fixed location in said milk, receiving said sound pulse at a location a fixed distance from said first location, generating a second sound pulse upon receiving said first sound pulse, and determining the frequency at which said sound pulses are generated, said frequency being proportional to the rate at which said sound waves pass through said milk.

4. The method of claim 3 further comprising the steps of separating raw milk into cream and skim milk, mixing a portion of said cream with said skim milk, said mixture being the milk in which said butter fat level is controlled, and degassing a portion of said milk prior to heating said milk to said first and second temperatures.

5. The method of claim 4 further comprising the steps of controlling a valve in response to said error signal, said valve controlling the amount of cream being mixed with said skim milk.

6. A method of continuously monitoring the butterfat content of a stream of milk comprising the steps of:

separating raw milk into cream and skim milk;

mixing a portion of said cream with said skim milk, said mixture being the monitored milk;

degassing a portion of said monitored milk;

heating a first portion of said stream of milk to a first temperature;

heating a second portion of said stream of milk to a second temperature;

determining the rate at which a sound wave passes through said first portion of milk after said first portion is heated to said first temperature;

determining the rate at which a sound wave passes through said second portion of said milk after said second portion is heated to said second temperature;

said steps for determining the rate at which a sound wave passes through said first and second portions of said milk including the steps of generating a sound pulse in said milk at a fixed location therein, receiving said pulse at a second fixed position in said milk, said second fixed position being a predetermined distance from said first fixed position, generating a second sound pulse upon receiving said first sound pulse, and determining the frequency at which said sound pulses are generated, said frequency being proportional to the rate at which said sound pulses pass through said milk; and comparing the difference between the rate at which said sound waves pass through said milk at said first temperature and the rate at which said sound waves pass through said milk at said second temperature, the level of butterfat in said milk being proportional to said difference.

7. The method of claim 6 further comprising the step of determining the level of solids-not-fat in said monitored milk, said determining step comprising the steps of comparing the difference between the frequency at which said sound pulses are generated in said milk heated to 45° and 65° C. and electronically correlating said difference to the level of solids-not-fat in said milk.

* * * * *